Patented June 18, 1940

2,204,748

UNITED STATES PATENT OFFICE 2,204,748

DYESTUFFS OF THE ACID WOOL CLASS

Edwin C. Buxbaum, Wilmington, Del., assignor to E. I. du Pont de Nemours & Company, Wilmington, Del., a corporation of Delaware No Drawing. Application August 3, 1938,
Serial No. 222,809

3 Claims. (Cl. 260—373)

This invention relates to the preparation of new and valuable dyestuffs of the acid wool series, and more particularly to the preparation of dyestuffs of this class which dye silk and wool in brown to brownish red shades by the usual acid dyeing methods and which dye these fibers in brown shades when dyed by the usual chrome dyeing methods.

A large number of dyestuffs have been produced in the anthraquinone series which in the form of their sulfonic acids dye wool and silk in shades varying from red to blue, but so far there has not been produced in this class compounds which dye wool and silk satisfactorily in fast brown shades. Most of the brown dyestuffs for wool in the anthraquinone series are water-insoluble compounds, such as "Rufigallol" (color index, Color 1052). This type of colors being practically insoluble are useful only in dyeing of mordanted fibers.

I have found that new and valuable dyestuffs which dye wool and silk in brown and red brown shades from acid baths or in desirable brown shades by the use of the usual chroming methods can be produced by sulfonating 1-hydroxy-2-arylaminoanthraquinones, which carry in the 4 position a substituent of the class consisting of hydroxy and arylamino groups, the sulfonation being carried out in such manner that at least one sulfonic acid radical is introduced into the anthraquinone nucleus. Sulfonation of an arylaminoanthraquinone by the processes ordinarily used in preparing anthraquinone acid wool dyestuffs introduces the sulfonic acid radical in the aryl group. The acid wool dyestuffs heretofore known which carry a sulfonic acid radical directly attached to the anthraquinone nucleus have been prepared by employing anthraquinone intermediates which already contain in the nucleus a sulfonic acid group or a substituent such as chlorine that can be readily replaced by the sulfonic acid group. These compounds, however, do not carry in the 1, 2 and 4 positions the particular substituents of the compounds of this application and hence do not dye animal fibers in brown shades. 1:4-dianilinoanthraquinone which carries a sulfonic acid group in the 6 position as well as in one anilido radical dyes wool in green shades. (Color Index 1081.) Similar dyes are also described under colors Nos. 1082 and 1087.

It is an object of this invention to produce new and valuable dyestuffs of the acid wool series which dye wool and silk by the ordinary chroming methods in desirable brown shades. It is a further object to provide a process for producing new and valuable dyestuffs of the acid wool series which dye in brown to red brown shades in a simple and economical manner and which is particularly adapted for large scale manufacture of these dyestuffs.

According to the present invention, any of the 1-hydroxy-anthraquinone compounds which carry in the 2 position an arylamino group in which the aryl radical is of the benzene series and which also carries in the 4 position a second hydroxy or arylamino group are sulfonated under conditions which introduce a sulfonic acid group in the anthraquinone nucleus. This may be done by employing more drastic conditions than those normally employed for the introduction of the sulfonic acid radical in the aryl group, such as stronger oleum or higher temperatures or both. Where the sulfonation of arylaminoanthraquinones is carried out in strong sulfuric acid or weak oleum, ordinary temperatures are employed. According to the present invention, I have found that the new brown dyestuffs may be produed by carrying out the sulfonation of the above identified arylaminoanthraquinones in oleum of 5 to 65%. Where the low percent oleum is employed, temperatures as high as 100° C. may be necessary. With the stronger oleums, such as 65%, the desired sulfonation may be effected at ordinary room temperatures. The resulting sulfonic acid compounds may be isolated by the usual isolation methods employed in the preparation of the known anthraquinone sulphonic acids.

The following examples are given to illustrate the invention. The parts used are by weight.

Example 1

100 parts of 2-para-toluidoquinizarin obtained by the condensation of 2-chloroquinizarin with para-toluidine or by the condensation of leuco purpurin with para-toluidine as prepared for "Alizarin Heliotrope" are dissolved in 1000 parts of sulfuric acid monohydrate. The temperature is allowed to rise as high as 50° C. A drop of the reaction mixture when dropped into 10 cc. of cold water should dissolve with a red color indicating the initial sulfonation in the aniline group is completed. There is then added over a period of 5 minutes, 400 parts of 65% oleum. The temperature rises to 70 to 80° C. and remains there until sulfonation is complete. This is evidenced by a bright orange color of the solution when a drop of the sulfonation mass is dissolved in 10 cc. of cold water. The sulfonation mass is poured out into 3000 parts of ice. The acid solution is then salted with 1000 parts of salt, agitated for 12 hours, filtered, and dried. The dyestuff so obtained dyes wool in brown shades of good fastness to light which changes to a darker brown on chroming.

*Example 2*

100 parts of dichloroquinizarin as produced according to the method described in co-pending application U. S. Serial No. 155,573 are suspended in 400 parts of aniline and 40 parts of sodium carbonate. The reaction mass is heated to 155 to 160° C. for a period of 6½ hours or until one of the chlorine atoms has been replaced by aniline. The mass is then cooled to 70° C. and diluted with 400 parts of ethyl alcohol, agitated for 10 hours at room temperature and filtered. The crystalline red cake is washed with 400 parts of ethyl alcohol and then steam distilled, filtered and dried.

The dark red, crystalline powder dissolves in organic solvents with a bright red color. It dissolves in concentrated sulfuric acid with a dark red color which changes to a dull violet with the addition of boric acid and to a bright blue green upon the addition of para-formaldehyde. When sulfonated in the customary manner with 10 parts of sulfuric acid monohydrate and one part of 65% oleum at room temperature, it yields a red dyestuff on wool which chromes to a grey in weak shades and a black in strong shades.

*Example 3*

100 parts of 2-anilino-chloroquinizarin as prepared in Example 2 (which carries the second chlorine in the remote Bz-ring of the anthraquinone nucleus) are dissolved in 100 parts of sulfuric acid monohydrate over a period of ½ hour under agitation keeping the temperature below 35° C. 300 parts of 65% oleum are then added over a period of 15 minutes. The temperature rises to about 70° C. and cools to about 40 C. in the course of 1 hour. The sulfonation mass is then poured into a mixture of 600 parts of ice and 2400 parts of water. The diluted sulfonation mass is brought to a boil and boiled for a period of 10 to 30 minutes. The disulfonic acid crystallizes out in yellow crystals. These are filtered off, sucked dry and sludged in 1000 parts of warm water (60° C.) and filtered, sucked dry and dried at 90 to 100° C.

The dyestuff obtained in the manner described is a yellow brown powder which dissolves in water with a reddish orange color. It dissolves in concentrated sulfuric acid with a dark color which changes very little upon the addition of boric acid or para-formaldehyde. From an acid bath, wool is dyed in bright orange brown shades which change to brown shades on chroming and exhibit good fastness to light.

*Example 4*

100 parts of the dibromoquinizarin (which carries one bromine atom in each of the benzene rings of the anthraquinone nucleus) prepared in co-pending application U. S. Serial No. 155,573 from quinizarin with sulfuryl chloride and bromine are suspended in 400 parts of aniline containing 40 parts of sodium carbonate. The reaction mixture is heated to 140 to 145° C. for a period of 5½ hours. It is then cooled to 70° C., 200 parts of ethyl alcohol are added, and the mass is stirred for 6 hours at room temperature and filtered. The anilino bromoquinizarin so obtained is a red crystalline powder which dissolves in concentrated sulfuric acid with a dark maroon color which changes to a dull violet upon the addition of boric acid and to a green with para-formaldehyde.

When sulfonated in the usual manner in sulfuric acid monohydrate or in weak oleum at room temperature, a red water-soluble dyestuff is obtained which dyes wool from an acid bath in red shades which change to grey on chroming and exhibit good fastness to light.

*Example 5*

100 parts of the anilino bromoquinizarin as sulfonated in the preceding example are added over a period of 1 hour to a mixture of 500 parts of sulfuric acid monohydrate and 500 parts of 65% oleum. The mixture is stirred for 1 hour and poured into a mixture of 2000 parts of ice and 2000 parts of water. The diluted reaction mass is brought to a boil and boiled for 10 minutes. 1200 parts of salt are then added and boiling is continued for 10 minutes. The hot suspension is then cooled to 80° C. and filtered. The cake is washed with 200 parts of cold water and sucked dry. The slightly acid cake is then mixed with 14.8 parts of sodium carbonate and dried at 90 to 100° C.

The dyestuff so obtained dyes wool from an acid bath in brown shades which change to a dark brown upon chroming and exhibits good fastness properties.

*Example 6*

100 parts of sulfuric acid monohydrate and 100 parts of 65% oleum are mixed thoroughly. To this solution, there is then added over a period of 2 hours 20 parts of 1-hydroxy-2:4-dianilino-anthraquinone commonly known as "Alizarine Blue Black B base". When all of this base has been added, the mass is stirred for 1 hour or until solution is entirely complete.

When sulfonation is complete, the sulfonation mass is poured into a mixture of 400 parts of ice and 400 parts of water. The temperature of the diluted mass will be about 90 to 100° C. The sulfonation mass is cooled to 60 to 65° C. and filtered.

The crystalline, solid precipitate is sucked dry and washed acid free with 20% brine. The compound obtained is an orange crystalline body which dyes wool from an acid bath in brownish red shades which change to a brown upon chroming by any of the usual chrome methods.

When 1-hydroxy-2:4-dianilinoanthraquinone is sulfonated in the customary manner, the dyestuff produced dyes wool from an acid bath in dull violet shades which change to grey upon chroming. The product obtained is, therefore, entirely different in character and constitution.

In the above examples where the disulfonation has been carried out as a separate independent reaction from the original monosulfonation, it is to be understood that the higher concentration of oleum and/or higher temperature may be employed at the start, as in Example 6, whereby sulfonation in the anthraquinone nucleus is effected in the same step with the sulfonation in the aryl-ring. The first step of Example 1 and Examples 2 and 4 disclose the preparation of new monosulfonic acids which on further sulfonation are converted to desirable brown dyestuffs.

As stated above, oleum of 5 to 65% concentration may be employed, although under the preferred conditions oleum of from 20 to 35% with temperatures above 60° C. are employed. In all cases, the dyestuff obtained dyes wool and silk by any of the usual chroming methods in brown shades of good fastness properties. They also dye wool or silk from acids by the usual methods in brown to brownish red shades. They are, however, not suitable for dyeing by the usual alkaline or neutral processes since apparently the sodium salts of the hydroxy compounds change in color depending upon the strength of the alkali. In dyeing by the usual chroming methods, this change does not occur.

I claim:

1. Acid wool dyestuffs comprising 1-hydroxy-2-arylaminoanthraquinones which carry in the 4 position a radical of the class consisting of hydroxy and arylamino groups and where in both cases the arylamino radical is of the benzene series, said compounds carrying at least two sulfonic acid radicals, one of which is directly attached to the anthraquinone nucleus, which dyestuffs dye wool by the usual chroming methods in brown shades.

2. Acid wool dyestuffs comprising 1,4-dihydroxy-2-arylaminoanthraquinonedisulfonic acids in which the aryl group is of the benzene series, which carry a halogen atom in the Bz-ring of the anthraquinone nucleus remote from that carrying the hydroxyl radicals, and which carries one sulfonic acid group in the aryl ring and one in the anthraquinone nucleus.

3. Acid wool dyestuffs comprising 1,4-dihydroxy-2-anilinoanthraquinonedisulfonic acids which carry a halogen atom in the Bz-ring of the anthraquinone nucleus remote from that carrying the hydroxyl radicals, and which carries one sulfonic acid group in the aryl ring and one in the anthraquinone nucleus.

EDWIN C. BUXBAUM.